United States Patent [19]
Starr

[11] 3,771,988
[45] Nov. 13, 1973

[54] HIGH TEMPERATURE APPARATUS FOR CONDITIONING GLASS
[75] Inventor: Eugene W. Starr, Allison Park, Pa.
[73] Assignee: PPG Industries, Inc., Pittsburgh, Pa.
[22] Filed: Feb. 14, 1972
[21] Appl. No.: 225,939

[52] U.S. Cl.......................... 65/337, 65/136, 65/374
[51] Int. Cl.............................................. C03b 5/04
[58] Field of Search..................... 65/134, 135, 137, 65/337, 338, 343, 374

[56] References Cited
UNITED STATES PATENTS
3,617,234  11/1971  Hawkins et al................. 65/134 X
3,196,504   7/1965  Limes............................. 65/374 X Primary Examiner—Arthur D. Kellogg
Attorney—Russell A. Eberly

[57] ABSTRACT
An improved gas-impingement manifold for homogenizing a viscous liquid such as molten glass at approximately 2,400° Fahrenheit comprises an inner tube, a unitary refractory liner within the inner tube, and an outer tube concentrically mounted about the inner tube to define a cooling jacket. The refractory liner is fabricated of a material having a low coefficient of thermal expansion and contains a plurality of discharge apertures which are aligned with a plurality of water-cooled gas-impingement nozzles that are fixedly mounted between the inner and the outer tubes. Gas is supplied to the interior of the manifold, and it is discharged through the discharge apertures and the nozzles to create a visible depression in the viscous liquid. A bleed port and a subplenum slot are provided in the manifold to maintain a uniform gas temperature and pressure and to provide a self-cleaning means for unwanted solid particles.

In a preferred embodiment, the outer tube is coated with at least one layer of a ceramic material to aid in insulating the manifold and to reduce the amount of sulfate build-up.

14 Claims, 6 Drawing Figures

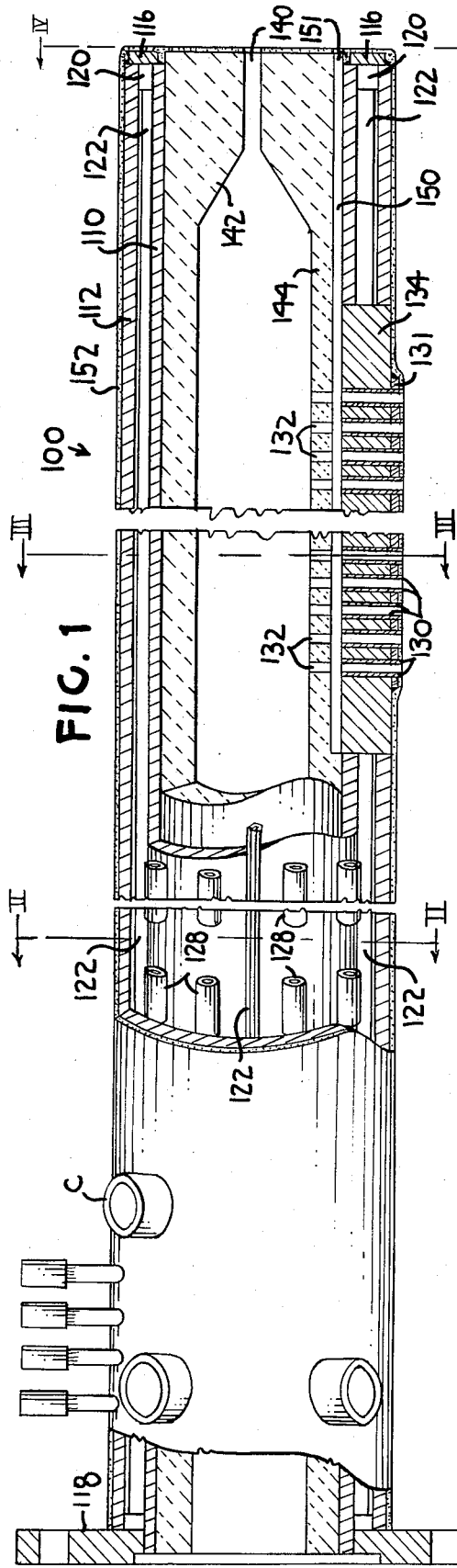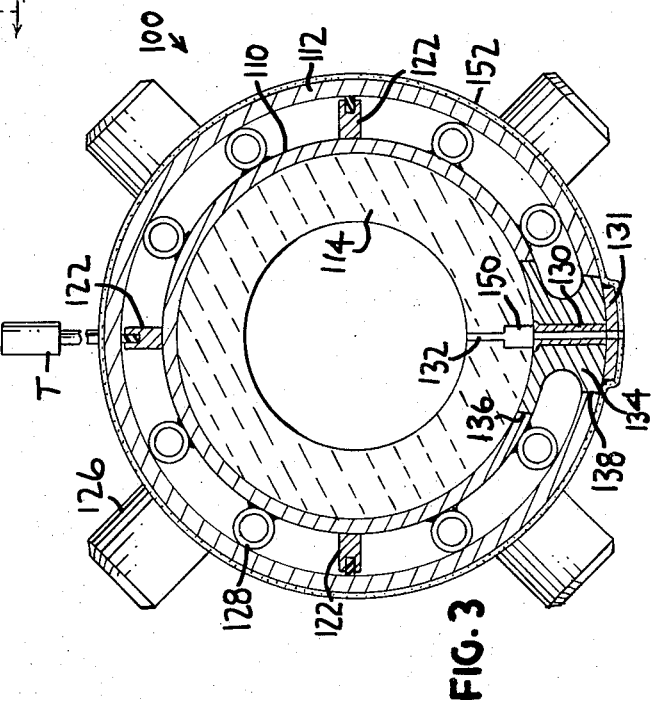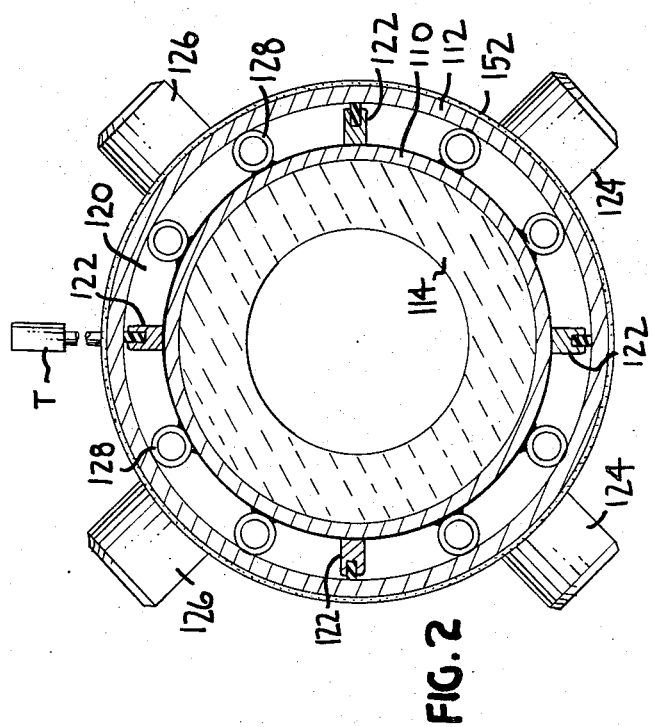

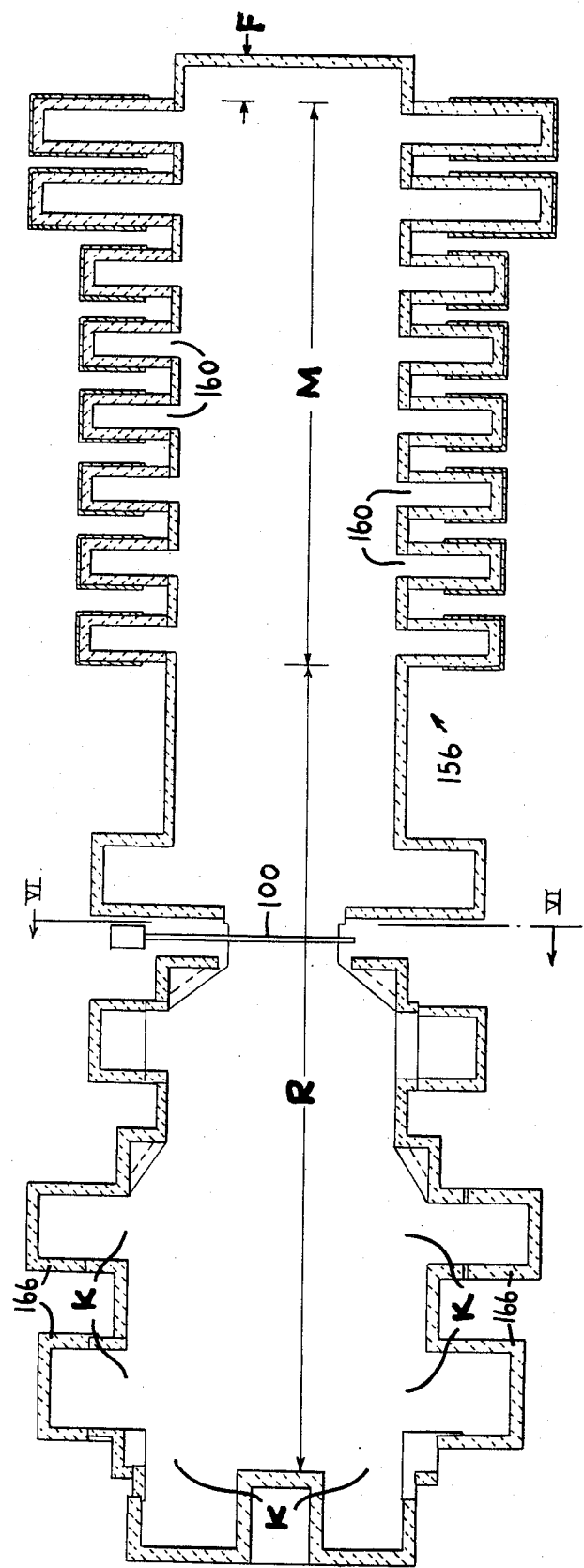

HIGH TEMPERATURE APPARATUS FOR CONDITIONING GLASS

BACKGROUND OF THE INVENTION

The present invention relates to an improved apparatus for creating and/or controlling flow in or homogenizing a liquid, such as molten glass. More particularly, the present invention relates to an apparatus for impinging a gas against the surface of a mass of molten glass in a container to initiate flow patterns therein and/or to control existing flow patterns and to effect exceedingly good homogenization thereof.

One of the most persistent problems inherent in the commercial production of quality glass is obtaining desired degree of homogeneity. Different glass products require varying degrees of homogeneity, but all require a minimum amount. Many techniques have been employed with varying degrees of success to obtain the desired homogeneity. Optical glass tanks, for example, have incorporated mechanical stirrers. Plate, sheet, bottle and window-glass tanks have utilized bubblers, mechanical stirrers, various strategically placed refractory members and various tank designs.

Experience has taught large-volume bottle-glass manufacturers, for example, that relatively large and relatively long melting tanks are required to produce good, homogeneous glass consistently and continuously. Some tanks must also incorporate means for retarding hot surface convective flows. Surface-flow retardation is necessary to prevent a layer of hot surface glass from passing through the tank to the forming end at a speed too high for the glass to become homogenized and too high to permit the glass to be brought into a desired or appropriate condition for forming. Typically, the means employed to retard the hot surface flows are surface skimmers made of clay refractory and/or throats in the tank construction. Both of these means tend to create defects in the glass, owing to wear of the refractory.

Because of the homogeneity requirement, a tank of the typical design for continuous glass-melting is expensive to construct, operate and maintain. The sheer bulk of the tank refractories requires a considerable capital expenditure. The cost of operating the tank is also high because a huge volume of glass must be continuously maintained at elevated temperatures. Glass manufacturers have long tried to design a smaller glass-melting tank which would permit a high volume of quality glass to be produced. This objective has been unattainable because of the time required to allow the convective currents in the glass mass to develop the required degree of homogenization. The objective could be attained, however, if the glass manufacturer could develop some means other than reliance on convection currents to homogenize the glass.

A technique for creating and/or controlling the flow patterns in molten glass has been disclosed in British Patent No. 1,171,133, issued to PPG Industries, Inc. The technique involves the impingement of streams of gas through nozzles that extend from the interior to the exterior of a manifold. The gas strikes the surface of molten glass with sufficient force to change substantially the surface flow patterns in the glass, if any, and to create and control surface flow patterns where none previously existed. This disclosure has taught that the degree of homogenization of glass is dependent not only upon the pressure of the impinging gas stream, but also upon the temperature of the gas, the angle of incidence of the gas stream relative to the molten glass surface, the temperature of the glass, the symmetry of the pressure of the gas stream or streams relative to the surface of the glass, and the like.

This technique has somewhat diminished the need to rely on convection currents and prolonged residence time in a tank to effect homogenization of molten glass. While it is an advance over prior techniques, it does not eliminate problems such as difficulty of maintaining a desirably uniform gas-impingement pressure, the difficulty of maintaining a uniform temperature distribution in the glass, the high susceptibility to deterioration of the gas-impinging apparatus, and the difficulty of coordinating the numerous parameters involved. Particularly, the high temperature to which the impingement apparatus is subjected in service causes a rapid deterioration of the gas-impingement nozzles. This deterioration, which involves erosion and/or plugging of one or more gas-impingement nozzles, tends to cause a variable gas-impingement pressure profile and to cause stones or ream in the resulting glass product. These defects are compounded by the fact that the gas-impingement temperature decreases by about 60° Fahrenheit per lineal foot of apparatus. This causes variations in the surface temperature of the molten glass and engenders in the glass a non-uniform viscosity and density.

U. S. Pat. No. 3,617,234, entitled "Apparatus for Conditioning Glass," issued on Nov. 2, 1971, to Charles T. Hawkins and Eugene W. Starr, discloses improved devices for impinging streams of a gas on the surface of molten glass to effect high degrees of glass homogeneity. These devices include several significant features. First, they may be used as a substitute for various other commonly employed mechanical homogenizing means in a glass-melting tank. Second, they may be operated to resist or enhance the naturally occurring convective flows in the glass tank. Third, they provide a substitute for the refractory members, such as mechanical stirrers and refractory skimmers, presently incorporated in tank design to control molten glass flow. This eliminates the possibility of contamination, which is always present when solid members, particularly ones of clay refractory, are immersed in molten glass. The devices may, however, be used in conjunction with skimmers, floaters, bubblers and stirrers when it is desired to combine the advantages of each. Finally, the patent suggests that the nozzles should not extend from the interior to the exterior of the manifold or they will be inadequately cooled since the water jacket is located only at the exterior of the manifold. The patent suggests discharge apertures in the inner pipe that do not engage nozzles that are inserted in the intermediate and outer pipe. Since the nozzles are at the outer portion of the manifold, they are adequately cooled.

The devices suggested in U. S. Pat. No. 3,617,234 eliminate many of the prior-art problems, but they leave room for improvement. For example, U. S. Pat. No. 3,617,234 suggests an inner tube of stainless steel, and this does not permit one to operate at temperatures above approximately 1,800° Fahrenheit for extended periods of time, or oxidation will result. Since this is substantially below the temperature of the molten glass, such a device cannot be used without its causing cooling of the molten glass. In addition, a device at this relatively low temperature develops a deposit of sulfate on its exterior, and the sulfate flakes off to contaminate the product. Further, the discharge apertures tend to become misaligned with the nozzles at elevated temperatures because of thermal-expansion effects. This causes a reduction of up to 25 percent in the impact pressure. Again, sufficient means are not provided to prevent clogging of the nozzles. This causes a non-uniform impingement of the gas onto the molten glass surface and yeilds inferior homogenization. Of course, the device may be removed from the tank periodically and the nozzles cleaned, but it is obviously desirable to maintain the device in operation for as long a period as possible. Accordingly, there still exists the need for commercially practicable devices for homogenizing glass efficiently while avoiding the aforementioned difficulties.

SUMMARY OF THE INVENTION

The present invention comprises a new and improved apparatus for impinging a stream or streams of a gas, such as air or air-gas burner combustion products, on the surface of molten glass which will effect exceedingly high degrees of glass homogeneity, yet which will obviate the above-described prior-art deficiencies.

The apparatus of the present invention includes a generally tubular, composite gas-impingement manifold which is axially rotatable to permit gas impingement at a selectively predetermined angle of incidence. The manifold comprises a unitary refractory liner, an inner tube and an outer tube. The liner is preferably cast within the inner tube to protect the inner tube from gas at high temperatures, such as 3,000° Fahrenheit. The inner tube and the outer tube are concentrically arranged and mounted such that the liner serves as a header or conduit for the gas, while a space between the inner and the outer tube defines a cooling jacket. The liner may be made of any suitable castable refractory material. It is desirable that it have a low coefficient of linear expansion between approximately 1,800° Fahrenheit and 2,400° Fahrenheit, such as, for example, approximately $\pm 5 \times 10^{-6}$ inches per inch per degree Fahrenheit, a temperature limit of at least about 3,000° Fahrenheit and a melting temperature of at least about 3,200° Fahrenheit. One material that has proven to be suitable is a castable refractory that is approximately 93.65 percent $Al_2O_3$, 5.40 percent CaO, 0.27 percent $Fe_2O_3$, 0.12 percent MgO, 0.03 percent $SiO_2$, a trace of $TiO_2$, and 0.11 percent alkalies, all by weight. This refractory is sold by Kaiser Refractories under the trademark Puro-Tab.

The refractory liner is provided with a gas-inlet opening, discharge apertures, a bleed port and a sub-plenum slot. The port and the slot, as described more fully hereinbelow, maintain a desirably uniform and symmetrical gas-impingement pressure and temperature distribution and provide a self-cleaning feature for unwanted solid particles.

A row of nozzles, preferably of heat-resistant ceramic material, such as fused aluminum silicate or alumina, is fixedly mounted between the inner and outer tubes. The nozzles are positioned initially so that they are aligned with the discharge apertures in the refractory liner. The cooling jacket cools the nozzles and the inner and outer tubes and therefore protects the tubes from thermal expansion. Due to the low coefficient of thermal expansion of the liner, there is little or no expansion of the liner and the nozzles remain aligned with the discharge apertures at all operating temperatures.

The pipe is preferably coated with at least one layer of a ceramic material that has a high operating temperature limit, such as 2,400° Fahrenheit, and a low linear coefficient of thermal expansion, such as $\pm 5 \times 10^{-6}$ inches per inch per degree Fahrenheit. It is also desirable that the material have both a high oxidation resistance and a high flame resistance. One suitable material is an adhesive sold by Aremco Products, Inc. under the trademark Ceramabond 503. The coating reduces the heat sink in the water jacket and retards build-up of sulfate deposits on the pipe.

BRIEF DESCRIPTION OF THE DRAWINGS

The invention will be more fully understood by reference to the following detailed description of a specific embodiment thereof, taken in conjunction with the drawings, wherein:

FIG. 1 is a longitudinal, partial sectional view, with portions removed for the sake of clarity, of a gas-impingement manifold embodying the principles of the present invention;

FIG. 2 is a sectional view taken along line II—II of FIG. 1;

FIG. 3 is a sectional view taken along line III—III of FIG. 1;

FIG. 5 is a plan view of a sheet glass tank for producing Pennvernon glass by the Pittsburgh Process.

DETAILED DESCRIPTION OF THE INVENTION

Figure 4:
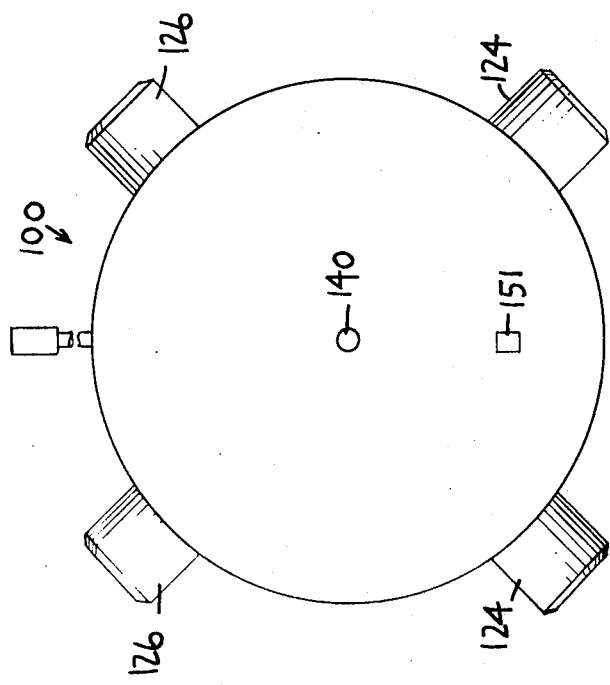
FIG. 4 is an end view taken along line IV—IV of FIG. 1.

As used in this specification and appended claims, the term "homogenization" is meant to describe a mixing or texturing action which renders molten glass of substantially uniform composition throughout. The term is also meant to describe a shearing action which attenuates the plano-parallel striae layers in molten glass so as to permit enhanced reduction of defects by a diffusion mechanism. The term "angle of stream impingement" is meant to describe the angle subtended by a line normal to the molten glass surface and a line parallel to the direction of gas stream flow. Positive angles are those which result when the direction of gas stream impingement is opposed to the natural surface flows in a tank. Positive angles of gas stream inpingement retard existing surface flows. Negative angles are those which result when the direction of gas stream impingement is in the same direction as the natural direction of surface flow in the tank. Negative angles accelerate the surface flow rates.

It will be appreciated that when employing the gas-impingement manifold of the present invention, the count of strain-causing cords, striae, ream and blisters, each of which results from the glass inhomogeneity, depends upon the impingement angle, the temperature of the impingement gas, the pressure of the impingement gas, the size of the nozzle orifice and the distance of the end of the nozzle orifice above the molten glass surface. It will also be appreciated that a proper selection of these parameters will increase glass yields (percentage of glass packed).

Generally speaking, the impingement angle may vary from about +80° to about −80°, depending upon whether the impingement function is one of surface flow retardation or homogenization, respectively. In this regard, a gas stream angle of incidence of from about 0° to about −30° is particularly suitable for homogenizing sheet glass in a refining region of a sheet glass tank. At an angle greater than 0°, the gas streams produce resistance to the glass flow and the amount of mixing substantially decreases. On the other hand, when a stream of gas is impinged at an angle more negative than −30°, the stream expands too much before striking the glass surface. The energy of the excessively expanded stream is poorly distributed and fails to maintain proper plano-parallel striae layers in the molten glass.

The preferred temperature of the impinging gas stream depends upon the melting characteristics of the glass involved, the firing techniques and the geometry of the melting tank being employed. For most purposes, the gas stream temperature should preferably be within approximately 25° Fahrenheit of the temperature of the molten glass. In commercial glass-making operations, this temperature is between approximately 1,800° Fahrenheit and 3,500° Fahrenheit, and usually approximately 2,400° Fahrenheit. The gas, however, may be introduced, in some instances, at room temperature (approximately 75° Fahrenheit) if the heat sink developed by operating the apparatus at this relatively low temperature is not detrimental to the operation or is compensated for by other heating means in the tank. In this regard, it should be noted that when desired, a pre-selected relatively low gas temperature may be utilized to effect a cooling of the glass. In order to prevent excessively low temperature glass from reaching the forming end of a glass tank, gas burners or electric heaters may be installed downstream from a gas-impinging apparatus to control the heat sink. An important feature of the present invention is that it is capable of handling a wide range of impingement gas temperatures, up to approximately 3,000° Fahrenheit.

In general, the closer the temperature of the gas is to the temperature of the molten glass, the greater the overall efficiency of the operation. For example, gas temperatures of approximately 2,400° Fahrenheit are preferred for the production of highly homogeneous PENNVERNON glass since the molten glass is at this temperature. Further, if the gas is below about 1,900° Fahrenheit, the gas stream has relatively insufficient energy to accelerate and agitate the molten glass, while above about 2,400° Fahrenheit, the energy density of the gas stream normally exceeds a critical value so that glass wave formation occurs at an excessive rate.

The workable gas pressure range is dependent upon the nozzle orifice diameter. For example, when nozzles having a ⅛-inch orifice are employed, the workable pressure is from about 40 to about 160 ounces per square inch over atmospheric pressure. Hereinafter, the abbreviation "osig." will be used to describe the pressure in ounces over atmospheric pressure. Excessively high gas pressures, though they result in increased shear action, result in excessive surface turbulence which causes bubbles to be trapped in the molten glass. Ordinarily, when nozzles having an orifice of about one-eighth inch are employed, pressures above approximately 160 osig. tend to cause striae malorientation, while pressures below approximately 40 osig. ordinarily result in inadequate homogenization and control over the surface flows since the glass stream has insufficient momentum to attenuate defects.

When the above-mentioned parameters are kept constant and only the distance between the nozzle orifices and the surface of the glass is varied, the following results are observed. As the distance between the nozzles and the glass is increased, the streams emanating from the nozzles expand excessively and overlap, thereby reducing the intensity of the momentum flux density in the direction necessary to accelerate the glass for proper defect attenuation. In this regard, a distance of about 6 inches between the nozzles and the surface of the glass is a practical upper limit, but a maximum distance of about 5 inches is preferred. Decreasing the distance below about one inch causes glass surface depressions or waves which are too deep for proper homogenization. When the depressions are excessively deep, the walls thereof tend to collapse and thus create non-planar flow patterns and inclusion of gases into the molten glass. In most applications of the present invention, the preferred height of the nozzles is from approximately one inch to approximately 3 inches above the surface of the glass.

The significance of the foregoing and the advantages of the present invention can be more fully understood by a consideration of the drawings taken in conjunction with the following description thereof.

Referring to FIGS. 1, 2, 3 and 4, there is shown a gas-impingement manifold 100 embodying the principles of the present invention. As illustrated in FIG. 1, the manifold 100 comprises an inner tube 110, an outer tube 112 concentrically mounted about inner tube 110, and a cast refractory liner 114 within the inner tube 110. Tubes 110 and 112 may be fabricated from low-carbon steel, such as SAE 1025, 1026 or 1030. Liner 114 may be made of any suitable refractory material having the properties set forth hereinabove, such as Puro-Tab. It is preferred that refractory liner 114 be of a unitary construction so that it is more capable of withstanding high temperatures without the possibility of gas seepage that would be present in a non-unitary member. By casting refractory liner 114 within inner tube 110, a suitable unitary construction is provided to serve as a gas conduit.

Inner tube 110 and outer tube 112 extend for approximately the same distance. A flange 116 is welded to the butt ends of inner tube 110 and outer tube 112. At the supply end of manifold 100, flange 118 is welded to inner tube 110 and outer tube 112 to define a cooling jacket 120. As shown in FIGS. 2 and 3, the cooling jacket 120 is divided into four compartments by watertight (rubber sealed) dividers 122. Two of the compartments are connected to water inlets 124 and the remaining two to water outlets 126. Dividers 122 extend for almost the entire length of manifold 100, but they are spaced from flanges 116 and 118 by about 2 inches to connect the compartments and insure that water does not flow from a water inlet 124 directly to a water outlet 126 without first cooling inner tube 110 and outer tube 112 along their lengths. The number of compartments is a matter of choice, and fewer or greater than four compartments may be provided.

Preferably, a plurality of mild steel tubes 128 are placed between inner tube 110 and outer tube 112 to maintain these tubes in a concentrically spaced relationship. The tubes may, for example, have an outside diameter of one-half inch and an inside diameter of three-eighths inch and they may be four inches long and spaced intermittently along the length of the manifold. Tubes 128 may be welded to inner tube 110.

Half coupling C (not shown in FIGS. 2, 3 and 4) may be welded to the exterior of outer tube 112 to facilitate rotation of the manifold 100, which in turn changes the angle of incidence of gas impingement upon the surface of the glass being treated. Elements T are extensions of thermocouples used to determine the temperature of impingement gas within inner tube 110.

As shown in FIG. 1, and particularly in FIG. 3, a row of nozzles 130 is disposed between the walls of inner tube 110 and outer tube 112. An important aspect of the present invention is that nozzles 130 are aligned with discharge apertures or ports 132 in the refractory liner 114. It has now been discovered that if the discharge apertures 132 are not aligned with the nozzles 130, impact pressure of the gas is reduced by as much as 25 percent. With this lower impact pressure, it becomes necessary to increase the flow rate of the gas to maintain a given impact pressure, and this is undesirable since increasing the gas flow rate also increases the likelihood of producing gas bubbles that become trapped beneath the surface of the molten glass and appear as defects in the product. Further, where the discharge apertures are not aligned with the nozzles, or where a longitudinally extending slot is used in place of the plurality of discharge apertures, uneven impact pressures often result, causing non-uniform mixing.

One advantage that the present invention has over the prior art is that it provides an apparatus whereby the discharge apertures and the nozzles are aligned at a wide range of operating temperatures. In accordance with the present invention, the refractory liner 114 is fabricated of a material that has a low linear coefficient of thermal expansion at all operating temperatures. As pointed out above, one material that has proven to be satisfactory is Puro-Tab. Tubes 110 and 112, which are preferably made of low carbon steel, have a relatively high linear coefficient of thermal expansion and would expand due to the presence of the impingement gas and the molten glass, both of which are at approximately 2,400° Fahrenheit, were it not for the cooling fluid between tubes 110 and 112. Since liner 114 does not expand due to its low linear coefficient of thermal expansion and tubes 110 and 112 do not expand due to the cooling fluid therebetween, the discharge apertures 132 stay aligned with nozzles 130 at all operating temperatures. In the apparatus illustrated in U. S. Pat. No. 3,617,234, an inner tube is fabricated of either a suitable high-temperature alloy such as 80 percent nickel, 14 percent chromium, and 6 percent iron, sold under the trademark Inconel, or a heat-resistant ceramic material, such as mullite in combination with a rigid, insulating, fiber material, sold under the trademark Fiberfrax. These materials have a relatively high coefficient of linear expansion at temperatures above approximately 1,000° Fahrenheit, so that even if the inner tube could withstand temperatures of approximately 2,400° Fahrenheit for extended periods of time (and the Inconel or the mullite-Fiberfrax combination cannot) and, even if the discharge apertures are aligned with the nozzles at one operating temperature, there is no way to align the discharge apertures with the nozzles for a variety of operating temperatures.

The nozzles 130, which may comprise any suitable heat-resistant material, such as fused aluminum silicate or alumina, are positioned in a metal insert bar 134 which, in turn, is welded in suitably disposed openings 136 and 138 in the walls of inner tube 110 and outer tube 112, respectively. The nozzles 130 may be bonded to the metal insert bar 134 by first coating them with a suitable ceramic cement, such as Ceramabond 503, and then push-fitting each of the nozzles 130 into an internal channel in the insert bar. In the alternative, the nozzles may be push-fit into the insert channels, and retained by a mild-steel nozzle retaining plate 131 with ¼-inch counter-bored holes that are concentric with the nozzle inside diameters. The nozzles may, for example, have a ⅛-inch inside diameter and may be placed on ½-inch centers. Ceramic nozzles, such as Model No. AP-35, manufactured by the McDaniel Company, have proven to be satisfactory.

As shown in FIG. 1, a bleed port 140 is provided in necked-down portion 142 of the refractory liner 114. It will be appreciated that bleed port 140 effectively avoids an increase in the pressure of the gas emanating from the nozzles 130 closest to the outlet end 144 of the refractory liner 114 and provides for excellent temperature uniformity along the length thereof.

Discharge apertures 132 open into a sub-plenum slot 150 that extends from the apertures 132 to the outlet end 144 of manifold 100. Slot 150 functions to make manifold 100 self-cleaning. In the prior-art devices, particles passing through the discharge apertures eventually left the manifold through its nozzles. Often, particles became lodged within the nozzles, thereby clogging the nozzles and producing non-uniform impingement gas pressures along the manifold. In the apparatus of the present invention, unwanted particles may pass through sub-plenum slot 150 which may be, for example, ¼ inch × ⅜ inch, and leave manifold 100 at exit 151, rather than through nozzles 130. FIG. 4 is an end view of manifold 100 showing bleed port 140 and exit 151.

In the preferred embodiment of the present invention, manifold 100 is coated at 152 with at least one layer of a suitable ceramic material, such as Ceramabond 503. Coating 152 functions to reduce the heat sink in the cooling jacket 120 and to minimize the build up of sulfate material on the exterior of manifold 100. This is important since it means that the manifold need not be removed from the tank for cleaning as often as was required with the prior-art apparatus. For example, consider that when the present apparatus is installed in a refining section of a sheet-glass tank practicing the Pittsburgh Process to produce Pennvernon glass, the manifold may be kept in operation for a period averaging about 11 days before it must be removed for cleaning. The manifold illustrated in U. S. Pat. No. 3,617,234 must be removed about three times a week when it is subjected to a similar environment.

EXAMPLE

To demonstrate further the advantages of the present invention, the following study was conducted in a continuous sheet glass operation practicing the Pittsburgh Process to produce Pennvernon glass. Referring to FIG. 5, there is shown a plan view of the operation. Batch was introduced continuously at a feeder end F of a tank 156. The batch passed through a melting section M where eight heaters 160 on each side of tank 156 melted the batch. The molten glass then passed through a refining section R to one of six kilns K at the drawing end of the tank 156. Six machines 166, one at each kiln K, each formed a continuous glass sheet which was cut at a cutting floor approximately 40 feet above the tank floor. Tank 156 was approximately 190 feet long and approximately 30 feet wide. The depth of the molten glass in tank 156 was approximately 50 inches. A gas-impingement manifold 100 was located as shown in FIG. 5. The inner tube 110 of the manifold 100 was fabricated of mild steel and had an inside diameter of five inches and an outside diameter of 5½ inches. A refractory liner 114 was cast in the inner surface of inner tube 110. It had an inner diameter of 3 inches and was made of a Puro-Tab refractory material. The outer tube 112 was composed of mild steel and had an inside diameter of 6½ inches and an outside diameter of 7 inches. A coating 152 was formed on the outer surface of outer tube 112. The coating consisted of two layers of Ceramabond 503 and was approximately one sixty-fourth inch in thickness.

The inner tube 110 and refractory liner 114 served as the header or conduit for the impingement gas and was provided with a multiplicity of discharge apertures 132, which allowed the impingement gas to pass from the interior of the refractory liner 114 and through a plurality of nozzles fabricated of an alumina-ceramic material, each of which were inserted into a metal insert bar 134 which was mounted between inner tube 110 and outer tube 112. Nozzles 130 were aligned with discharge apertures 132. Cooling water was supplied to inlets 124 and circulated between the walls of the inner tube 110 and the outer tube 112. The water came into direct contact with the metal insert bar 134 and thus provided excellent cooling of the nozzle plate 131 that retained the nozzles. Water was then returned through outlets 126. Dividers 122 of mild steel were provided between tubes 110 and 112 to divide the cooling jacket into separate compartments. Inpingement gas was bled from the manifold by means of the bleed port 140 to provide for a more uniform temperature and pressure distribution of the impingement gas in refractory liner 114. It also allowed foreign particles within refractory liner 114 to be discharged from the manifold. Exit 151 provided an exit path for unwanted solid particles in slot 150 and left nozzles 130 unclogged. The overall length of manifold 100 was 15-¾ feet, of which only a 143-inch segment thereof substantially centered over the forehearth was provided with gas-impingement nozzles 130. The nozzles 130 each had a one-eighth-inch inside diameter, were located one-half inch apart on their centers, and were 287 in number. The discharge apertures were approximately three-sixteenths inch in diameter.

Figure 6:
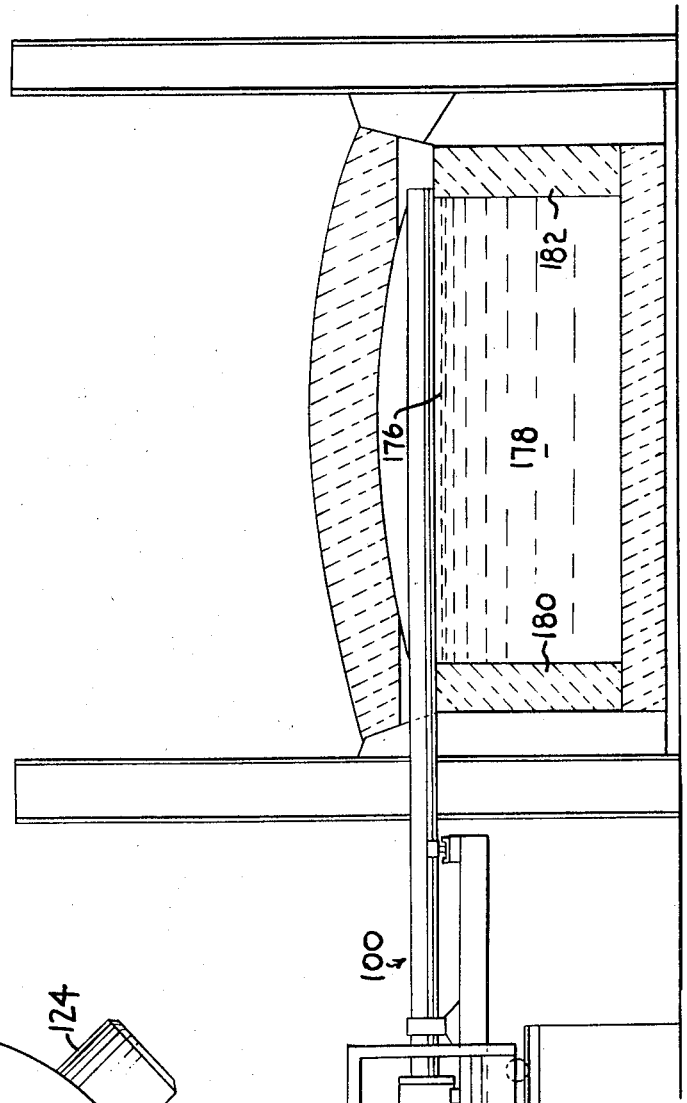
FIG. 6 is a partial, cross-sectional, elevational view taken along line VI—VI of FIG. 5.

Referring to FIG. 6, there is shown a view of the gas-impingement manifold 100 taken along line VI—VI of FIG. 5. A mixture of the products of combustion of natural gas and excess air was used as the impingement gas. The air source comprised a cylindrical excess air-gas burner in which the output was fed into the inlet of the manifold 100. Such a burner, illustrated schematically at 170 in FIG. 6, is commercially available. As shown, the burner was so mounted as to be concentric with manifold 100 and to be adjustably rotatable so that the nozzles of the manifold could be aligned at any desired angle with respect to the horizontal. Such a burner-manifold combustion was conveniently mounted on a roller frame 172, which was guided on tracks 174 so that the manifold 100 could be inserted and removed from the tank 156. The tracks 174 and the roller frame 172 were so arranged that the manifold 100 was adjustably disposed a preselected distance above the surface of the glass 176, while the nozzles 130 were disposed symmetrically with respect to the furnace walls 180 and 182. The nozzles did not extend across the entire width of the tank, from one wall to the other wall, so as not to disturb the small amounts of cooler glass that normally settle adjacent to the walls.

The glass being prepared during this study had the following composition:

| Component | Approximate Percent By Weight |
|---|---|
| SiO$_2$ | 73.23 |
| NaK$_2$O | 13.52 |
| CaO | 8.22 |
| MgO | 3.50 |
| Al$_2$O$_3$ | 1.22 |
| Fe$_2$O$_3$ | 1.12 |
| FO$_3$ | 0.20 |

The temperature of the glass at manifold 100 was about 2,400° Fahrenheit. It had a density of approximately 2.5 and a softening point of approximately 1,325° Fahrenheit.

The tank 156, when filled to capacity, contained approximately 2,600 tons of raw batch and molten glass. Glass was drawn vertically from machines 166 at a rate of between approximately 350 and approximately 370 tons per day.

Table I below represents data concerning the amount of ream and other defects in the glass. Run No. 1 was conducted with no gas-impingement manifold. Run No. 2 was conducted with the gas-impingement manifold disclosed in U. S. Pat. No. 3,617,234. Run Nos. 3, 4, 5 and 6 were conducted with the gas-impingement manifold of the present invention. In each case, the nozzle outlets were approximately 3 inches above the molten glass surface and directed at an angle of approximately 7.5°. Other than the conditions specified, there was no change in any operating condition that might have a significant effect on the defects listed.

TABLE I

| Run number | Period of run, days | Temperature of impingement gas (° F.) | Average gas pressure, p.s.i.g. | 0-3 inch ream percent sheet | Above 8 inch ream percent sheet | Defects per 100 square feet |
|---|---|---|---|---|---|---|
| 1 | 68 | | | 17.0 | 45.9 | 1.50 |
| 2 | 135 | 1,800 | 100 | 14.2 | 52.1 | 1.90 |
| 3 | 7 | 2,200 | 70 | 15.3 | 48.7 | 0.95 |
| 4 | 7 | 2,400 | 80 | 9.9 | 59.9 | 0.94 |
| 5 | 7 | 2,500 | 75 | 10.0 | 50.3 | 0.86 |
| 6 | 7 | 2,600 | 90 | 13.4 | 50.0 | 0.92 |

The term "ream" may be defined as inclusions within the glass or layers of glass which are not homogeneous with the main body of the glass. In the Table, the figures relating to "0-3 Inch Ream" and "Over 8 Inch Ream" refer to the results of shadowgraph tests. In a darkened room, light is passed through the sample of glass in question, and the glass is moved toward a screen while dark and light areas appear on the screen. Samples that contain severe ream need to be moved quite close to the screen (less than 3 inches, for example) before the dark and light areas they produce disappear. On the other hand, with samples that are quite good, the light and dark areas will diaappear at greater distances (such as over eight inches). In other words, it is desirable to get a low percentage of "0-3 inch ream" and a high percentage of "over 8 inch ream."

In Table I, "Defects per 100 square feet" includes knots, stones, blisters, dirt, strings, seeds and miscellaneous. This, along with ream, is a direct measure of the degree of homogeneity of the glass. The term "knots" may be defined as transparent areas of incompletely assimilated glass having an irregular knotty or tangled appearance. The term "stones" may be defined as any crystalline inclusion embedded in the glass. The term "blisters" may be defined as bubbles in the glass, greater than one thirty-second inch in diameter. The term "dirt" may be defined as a small particle of foreign matter embedded in the glass surface. The term "strings" may be defined as transparent lines appearing as though a thread of glass had been incorporated into the sheet. The term "seeds" may be defined as a small bubble in the glass, less than one thirty-second inch in diameter.

The results of this study are very dramatic. Based on the figures in Table I, Run No. 4 shows a 42 percent improvement in "0–3 Inch Ream" and a 23 percent improvement in "Above 8 Inch Ream" over Run No. 1. Further, there is a 37 percent improvement in "Defects per 100 square feet." When comparing Run No. 4 against Run No. 2, there is a 30 percent improvement in "0–3 Inch Ream," a 13 percent improvement in "Above 8 Inch Ream," and a 50 percent improvement in "Defects per 100 square feet." These improvements are significant.

Analyzing the impingement manifold of the present invention from another viewpoint, consider what it has done to yields. Pennvernon glass was made by the Pittsburgh Process in a tank as illustrated in FIG. 5. For 27 days, the operation was conducted with no gas-impingement manifold. Then, the manifold described in U. S. Pat. No. 3,617,234 was inserted for 39 days, operating at 1,800° Fahrenheit. Finally, this manifold was replaced by he present manifold which operated for 7 days at 2,400° Fahrenheit. With no manifold, the tank yield was 91 percent; the cutting yield was 71 percent; and the overall yield was 65 percent. With the prior-art manifold, the tank yield was 94 percent; the cutting yield was 72 percent; and the overall yield was 68 percent. With the present manifold, the tank yield was 96 percent; the cutting yield was 75 percent; and the overall yield was 72 percent. This is quite significant when one considers that in an industrial process of this kind, a yield improvement of as little as one percent is enough to justify the cost of installing and operating the equipment of the instant invention.

While the present invention has been described in terms of specific example, it should be understood that they are merely illustrative of the principles of the present invention, and that the scope of the invention should be limited only by the language of the appended claims. For example, while gas manifold 100 has been described hereinabove as containing a single row of preferably equally spaced, equally sized, circular nozzles as the means for directing the gas onto the surface of the molten glass, more than one row of nozzles may be used. The nozzles need not have circular cross-sections, but may have oval, square, octagonal, triangular or any other shaped cross-section as desired. The nozzles may even vary in cross-section along the length of the manifold.

In addition to a series of nozzles, the manifold may be constructed using a series of short slots as the gas exit means.

The manifold may also be fabricated with means for adjusting the size of the nozzles or the slots, severally or collectively. A typical adjustable design would consist of two concentric water-cooled pipes having a common pattern of holes or slots which could be rotated with respect to each other to align the openings for maximum gas output or to disalign the openings to completely cut off the gas supply. At various positions in between, varying amounts of gas could be released.

The present apparatus contains all of the advantages set forth in U. S. Pat. No. 3,617,234. In addition, there are several features of the present apparatus that are not met in the devices disclosed in the above-mentioned patent. First, due to the low linear coefficient of thermal expansion of the liner, the discharge apertures in the liner are aligned with the nozzles at operating temperatures up to approximately 3,000° Fahrenheit, and as a result, the impact pressures are increased by as much as 25 percent for any given flow rate. This is important since it makes it possible to minimize flow rates, thereby minimizing the chance of producing gas bubbles in the molten glass. In addition, impact pressures are more uniform when each discharge aperture is aligned with a nozzle. Second, the liner is cast or otherwise snugly fitted into the inner tube so that there is obtained a unitary construction with less chance of gas leakage. Third, the impingement gas is kept from any contact with metal, from the combustion chamber to the nozzle. This permits the use of the impingement gas at a higher temperature, which is advantageous for two reasons. With hotter gases, cooling of the glass and alteration of its viscosity is avoided. Additionally, the higher the temperature of the impingement gas, the less is the likelihood of developing sulfate deposits on the manifold exterior. Fourth, the back end of the manifold is open so that a self-cleaning slot between the discharge apertures and the nozzles may be used to withdraw impingement gas. This slot tends to keep the nozzles unclogged so that the impact pressure across the manifold onto the molten glass is constant and the mixing is uniform. Fifth, the pipe preferably is coated with at least one layer of a ceramic material, such as Ceramabond 503, to reduce the heat sink in the water jacket and inhibit or retard the build up of deposits of sulfate on the exterior of the manifold, so that it requires cleaning less frequently. Sixth, the present apparatus is more flexible than any previously disclosed. If one desires, it may be operated at temperatures on the order of 1,800° Fahrenheit. However, it may also be operated at temperatures of approximately 3,000° Fahrenheit, or anywhere in between, for extended periods of time, without damaging the manifold. Finally, the present apparatus is better able to withstand the effects of being put into and taken out of service, since the expansion and contraction of the liner is minimal.

I claim:

1. An apparatus for homogenizing a hot viscous liquid in a container which comprises means for impinging at least one stream of gas at a temperature up to about 3,000°F. against the surface of the viscous liquid, said means comprising:
 a conduit comprising:
  a first tube means extending laterally above the surface of the hot viscous liquid and having an inlet end, an outlet end and at least one opening therethrough overlying the surface of said hot viscous liquid; and a refractory liner disposed in said first tube, said liner having a low linear coefficient of thermal expansion and at least one discharge aperture aligned with the least one opening of of said first tube, the linear coefficient of thermal expansion of said liner being such that said liner does not materially expand at the temperature at which said hot viscous liquid is maintained;

a second tube disposed outwardly about said conduit and spaced therefrom, said outer tube means having at least one opening therethrough that is substantially aligned with an adjacent opening in said liner, and means for introducing a cooling fluid between said conduit and said second tube to maintain at least said second tube at a temperature below that of the liquid, and at which the expansion of said second tube is substantially suppressed sufficient to maintain the openings in said second tube and said liner substantially aligned throughout at the temperature at which said hot viscous liquid is maintained.

2. An apparatus according to claim 1 in which said liner is made of a refractory metal and has a coefficient of thermal expansion between about $-5 \times 10^{-6}$ and $+5 \times 10^{-6}$ inches per inch per degree Fahrenheit.

3. An apparatus according to claim 1, further including means between said first tube and said liner for preventing unwanted particles from clogging the at least one opening of said first and said second tube, said preventing means extending from the at least one discharge aperture of said liner to at least one of the ends of said first tube.

4. An apparatus according to claim 1, in which said second tube is coated with at least one layer of a ceramic coating to minimize deposits on said apparatus.

5. An apparatus for homogenizing hot viscous liquid in a container which comprises means for impinging at least one stream of gas at temperatures up to about 3,000°F. against the surface of the viscous liquid, said means comprising:

a conduit comprising:
a first tube extending laterally above the surface of the hot viscous liquid and having an inlet end, an outlet end and at least one opening therethrough overlying the surface of said hot viscous liquid; and a refractory liner disposed in said first tube, said liner having a low linear coefficient of thermal expansion, the linear coefficient of thermal expansion of said liner being such that said liner does not materially expand at the temperature at which said hot viscous liquid is maintained, and having at least one discharge aperture aligned with the at least one opening of said first tube;

a second tube disposed outwardly about said conduit and spaced therefrom, said second outer tube having at least one opening therethrough that is substantially aligned with an adjacent opening in said liner, nozzle means fixedly mounted in the openings of said first and second tubes, said nozzle means having a longitudinal channel therethrough that is aligned with said at least one discharge aperture so that said channel is in direct fluid communication with the interior of said liner; and means for introducing a cooling fluid between said conduit and said second tube to maintain at least said second tube at a temperature below that of the liquid, and at which the expansion of said second tube is substantially suppressed sufficient to maintain the openings in said second tube and said liner substantially aligned throughout at the temperature at which said hot viscous liquid is maintained.

6. An apparatus according to claim 5, in which said coefficient of thermal expansion is between about $-5 \times 10^{-6}$ and $+5 \times 10^{-6}$ inches per inch per degree Fahrenheit so that said at least one discharge aperture is aligned with said longitudinal channel at impingement gas temperatures of from approximately 1,800 degrees Fahrenheit to approximately 3,000 degrees Fahrenheit.

7. An apparatus according to claim 6, in which said second tube is coated with at least one layer of a ceramic coating to minimize deposits on said apparatus.

8. An apparatus according to claim 5, further including:

means between said first tube and said liner for passing unwanted particles from said apparatus to prevent clogging of the channel of said nozzle means wherein said passing means extends from the at least one discharge aperture to at least one of the inlet end and the outlet end.

9. An apparatus for homogenizing a hot viscous liquid in a container which comprises means for impinging at least one stream of gas against the surface of the viscous liquid, said means comprising:

a conduit comprising:
a first tube having an inlet end, an outlet end and at least one opening therethrough; and
a refractory liner disposed in said first tube, said liner having at least one discharge aperture and a low linear coefficient of thermal expansion;

a second tube disposed about said conduit and spaced therefrom;

nozzle means fixedly mounted in the openings of said first and second tube, said nozzle means having a longitudinal channel therethrough that is aligned with said at least one discharge aperture so that the channel is in direct fluid communication with the interior of said liner;

means for introducing a cooling fluid between said conduit and said second tube for cooling at least said nozzle means; and means between said first tube and said liner for passing unwanted particles from said apparatus to prevent clogging of the channel of said nozzle means wherein said passing means extends from the at least one discharge aperture to at least one of the inlet end and the outlet end.

10. An apparatus according to claim 9, in which said passing means includes a slot extending from the at least one aperture to the outlet end.

11. An apparatus according to claim 9, in which said coefficient of thermal expansion is between about $-5 \times 10^{-6}$ and $+5 \times 10^{-6}$ inches per inch per degree Fahrenheit.

12. An apparatus according to claim 9, in which said second tube is coated with at least one layer of a ceramic coating to minimize deposits on said apparatus.

13. An improved apparatus for impinging at least one stream of gas against the surface of a viscous liquid with sufficient force to create a visible disruption of the surface of the viscous liquid in the immediate area of gas impingement to homogenize the viscous liquid, said apparatus having a first inner tube means having an inlet end, an outlet end and at least one discharge aperture transversely disposed relative to the longitudinal axis thereof; a second tube means substantially concentrically disposed about said first inner tube means, said second tube means having at least one opening therethrough in fluid communication with said discharge aperture; a third tube means substantially concentrically disposed about said second tube means and spaced therefrom to define a substantially annular space therebetween, said third tube means having at least one opening therethrough in fluid communication with said discharge aperture; nozzle means fixedly mounted in the opening in said second and third tube means, said nozzle means having a longitudinal channel therethrough in fluid communication with the interior of said first tube means; and means for introducing a cooling fluid into said annular space between said second and third tubes for thereby cooling said nozzle means, wherein said improvement comprises:

said first inner tube means consisting of a refractory liner having a low coefficient of thermal expansion and the at least one discharge aperture in axial alignment with the channel of said nozzle means;

slot means between said first inner tube means and said second tube means for passing unwanted particles from said apparatus to prevent clogging of the channel of said nozzle means, wherein said slot means extends from the at least one aperture to the outlet end; and at least one layer of a ceramic coating on said third tube means to minimize deposits on said apparatus.

14. An apparatus according to claim 13, in which the coefficient of thermal expansion is between about $-5 \times 10^{-6}$ and $+5 \times 10^{-6}$ inches per inch per degree Fahrenheit so that said at least one discharge aperture is aligned with said longitudinal channel at impingement gas temperatures of from approximately 1,800 degrees Fahrenheit to approximately 3,000 degrees Fahrenheit.

* * * * *